Nov. 21, 1961 G. P. GALE 3,009,390
PHOTOMETER SLIT MECHANISM
Filed Feb. 13, 1958 2 Sheets-Sheet 1

George P. Gale,
INVENTOR.

By His Attorneys.
Harris, Kiech, Foster & Harris.

Nov. 21, 1961    G. P. GALE    3,009,390
PHOTOMETER SLIT MECHANISM
Filed Feb. 13, 1958    2 Sheets-Sheet 2
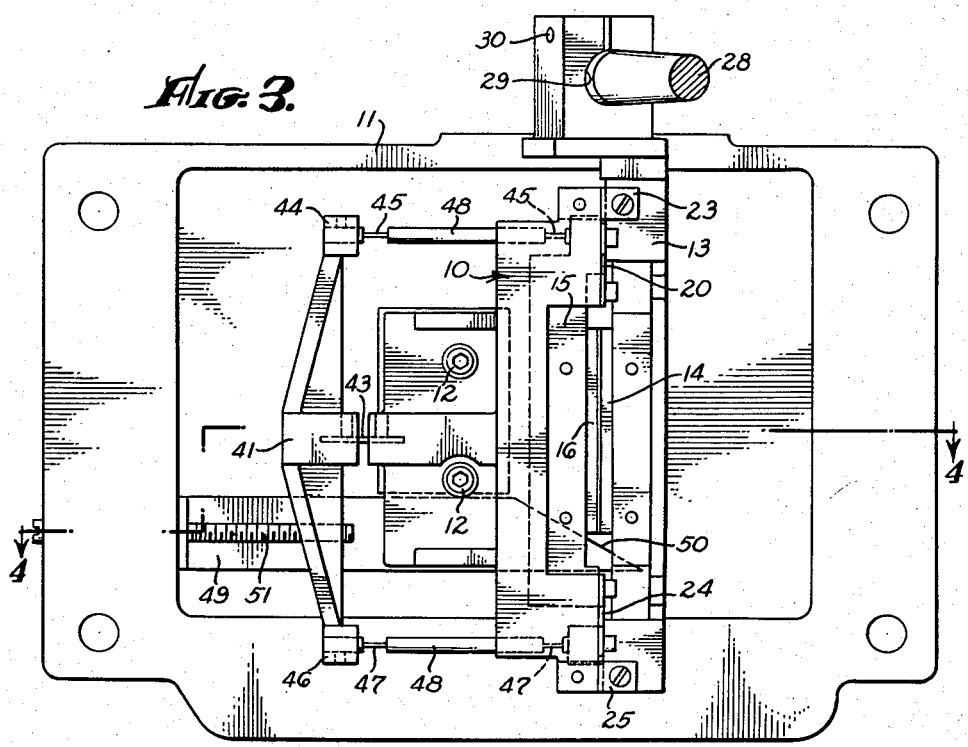
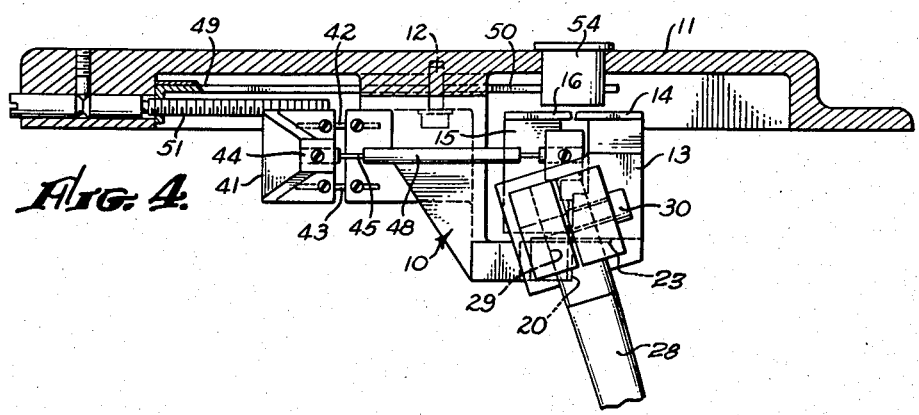
GEORGE P. GALE,
INVENTOR.
By His Attorneys.
HARRIS, KIECH, FOSTER & HARRIS.

United States Patent Office 3,009,390
Patented Nov. 21, 1961

3,009,390
PHOTOMETER SLIT MECHANISM
George P. Gale, Orange, Calif., assignor to Beckman Instruments, Inc., a corporation of California
Filed Feb. 13, 1958, Ser. No. 715,112
7 Claims. (Cl. 88—61)

This invention relates to mechanism for controlling the size of the light passage slit of a monochromator or the like.

In a spectrophotometer utilizing a monochromator it is often required that the light energy be maintained constant while the wave length of the incoming beam changes. Also it is often desired to vary the light energy in order to balance the detector signal against a reference voltage. This adjustment can be accomplished by passing the beam through one or more slits and varying the width of the slit as a function of the wave length or of the energy transmitted or the like. It is an object of the invention to provide a mechanism for precisely varying the size of a slit. A further object of the invention is to provide a slit mechanism for varying a slit over a width range in the order of one thousand to one, e.g., from a few microns to a few millimeters, while maintaining accuracy to a micron in the narrow width region.

It is another object of the invention to provide a substantially frictionless structure for a slit mechanism so that errors due to friction are substantially eliminated. Another object of the invention is to provide a cam and cam follower system for actuating the slit mechanism in which the friction of the cam follower and cam enhances rather than opposes the desired accuracy.

It is a further object of the invention to provide a slit mechanism utilizing a pair of rotating or pivoting slit jaws which move bilaterally, i.e., which move equal amounts in opposite directions so as to maintain the center line of the beam fixed. Another object of the invention is to provide such a slit mechanism in which the slit jaws are pivoted on a single axis and one in which the slit jaws are mounted on flexible reed hinges.

It is a further object of the invention to provide a slit mechanism having a coupling for driving the two slit jaws simultaneously in opposite directions and through equal angles. Another object of the invention is to provide a mechanism in which the two jaws are coupled by means of a see-saw lever carried on the frame with the ends of the lever coupled to the two jaws, respectively, providing the equal and opposite motions of the jaws.

The invention also comprises novel details of construction and novel combinations and arrangements of parts, which will more fully appear in the course of the following description. The drawings merely show and the description merely describes a preferred embodiment of the present invention which is given by way of illustration or example.

In the drawings:

FIG. 3 is a side view of a slit mechanism similar to that of FIG. 1;

FIG. 4 is a sectional view taken along the line 4—4 of FIG. 3; and

Figure 1:
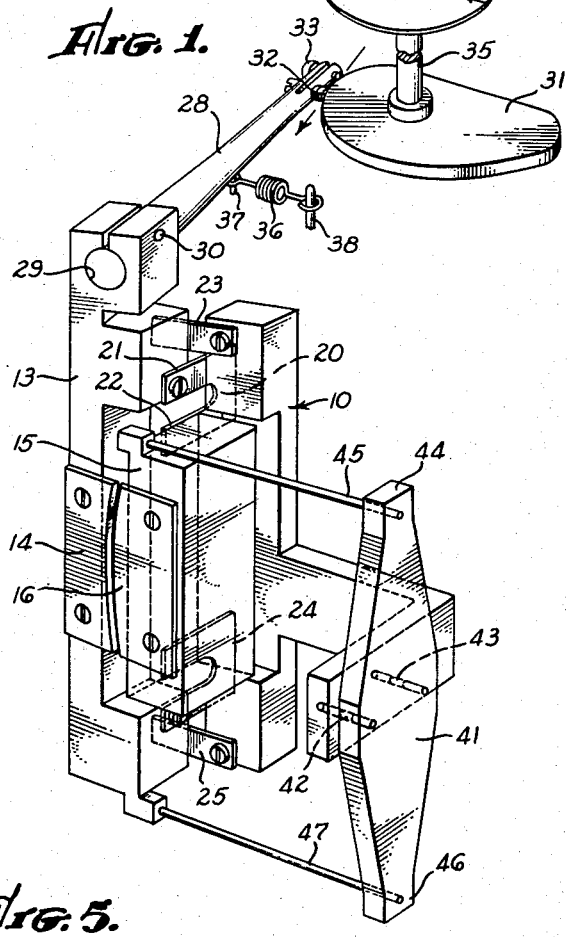
FIG. 1 is an isometric view of a preferred embodiment of the invention.

The slit mechanism of the invention includes a frame 10 which is stationary and which may be carried on a mounting plate 11 with screws 12, the mounting plate not being shown in FIG. 1. A jaw member 13 carrying a slit plate 14 is mounted on the frame 10 for rotation relative to the frame. Another jaw member 15 carrying a slit plate 16 is also mounted on the frame 10, preferably for rotation about the same axis as the member 13. The adjacent edges of the slit plates 14, 16 serve to define the slit through which the light beam passes. This slit may have any desired shape, such as the arcuate shape of FIG. 1 or the straight shape of FIG. 3. The two jaw members 13, 15 are pivoted toward and away from each other to vary the size of the slit formed by the slit plates.

Figure 2:
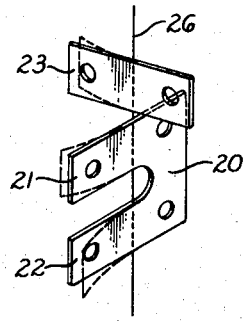
FIG. 2 is an enlarged view showing the hinge structure of the embodiment of FIG. 1.

The jaw members are carried on the frame in a frictionless hinge structure comprising two pairs of reed hinges, the upper hinge of each pair being shown in detail in FIG. 2. A U-shaped plate 20 of a resilient material, such as spring steel or Phosphor bronze, is mounted on the frame 10 at the bight of the U by suitable means such as screws. One arm 21 of the plate 20 is fixed to the member 13 and the other arm 22 is fixed to the member 15. Of course the U plate 20 could be made in two separate pieces if desired. Another plate 23 of resilient material is mounted at one end on the frame 10 and at the other end on the member 13, the plate 23 being positioned perpendicular the plate 20 to provide a cross reed hinge for the member 13. A U-shaped plate 24 similar to the plate 20 and a plate 25 similar to the plate 23 are mounted at the lower ends of the frame and jaw members to complete the hinge units. Additional reed elements could be used, if desired, at the upper and lower ends of member 15 to form cross-reed hinge-type supports for this member also, but this has been found unnecessary in the design shown.

The two jaw members pivot relative to the frame on the two sets of plates or reeds about a single axis, indicated by the line 26 of FIG. 2, with no sliding or rolling friction involved. The double hinge structure also permits bilateral motion of the jaw members, i.e., the two jaw members may be moved simultaneously in opposite directions to narrow or widen the slit while maintaining the center line of the slit constant.

Figure 5:
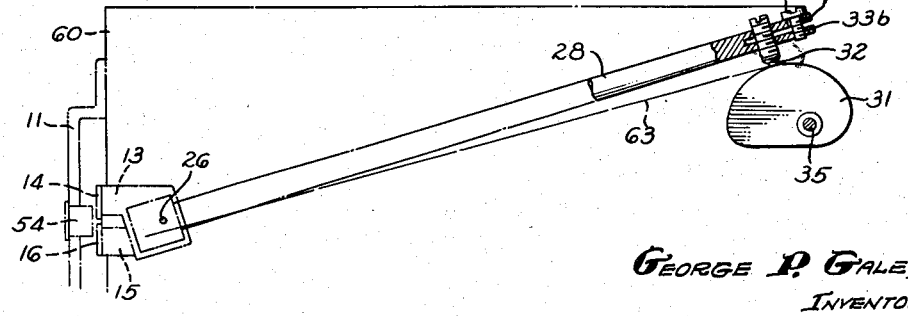
FIG. 5 is a diagram illustrating the relative positions of certain elements of the mechanism.

The jaw member 13 is rotated about the frame 10 by an arm 28 which is clamped in a slotted opening 29 in the jaw member 13 by a screw 30. In the embodiment illustrated herein, the arm 28 is driven by a cam 31, the arm having a cam follower 32 which is threaded into an opening in the arm. (FIGS. 1 and 5). The cam follower 32 is clamped in position by a screw 33 which passes through one side 33a and threadedly engages the other side 33b of the slotted end of the arm 28 to compress the end. The cam 31 and a dial 34 are mounted on a common shaft 35, the dial providing an indication of the size of the slit. A spring 36 with one end engaging a pin 37 on the arm 28 and the other end engaging a fixed pin 38 urges the cam follower into engagement with the cam.

The slit mechanism of the invention includes a coupling for driving the two jaw members simultaneously and in opposite directions. In the present embodiment, the arm 28 drives the member 13 which in turn drives the member 15 through the coupling. A lever 41 is mounted on the frame 10 for pivoting motion in a plane, the lever preferably being mounted on flexible rods 42, 43 which have their ends fixed in the frame and the lever respectively. One end 44 of the lever 41 is coupled to the jaw member 15 by a flexible rod or link 45 and the other end 46 of the lever is coupled to the jaw member 13 by a similar flexible rod or link 47. In the structure of FIGS. 3 and 4, the rods 45, 47 are provided with rigid center sections 48 for damping vibrations which may be generated in the rods.

As the jaw member 13 is pivoted by the arm 28, the lever 41 is also pivoted to provide rotation of the jaw member 15 counter to that of the jaw member 13. The motion of the lever 41 during opening and closing of the slit is similar to that of a see-saw or teeter-totter. The location of the rods 45, 47 in the jaw members and the lever may be varied to produce any desired relative movement between the two jaw members. It is preferred to have the rod ends at the lever 41 equally spaced from the pivot line of the lever, and the rod ends at the jaw members equally spaced from the pivot axis of the members, thereby producing equal movement of the two jaw members.

A plate 49 having a wedge-shaped end 50 is translated by a lead screw 51 rotatably positioned in the mounting plate 11. The end 50 is passed in front of the slit defined by the plates 14, 16 providing a control of the length of the slit and thereby a coarse control on the energy passing through the slit. A tube 54 is mounted in the plate 11 serving as a light shield about the upper or exit beam passing through the slit.

The slit mechanism of the invention described herein is used for varying a slit from a few microns to several millimeters in width, and maintaining the slit, at any given width, to the desired setting with high precision and stability. Thus, backlash, slop, friction, and the like, causing slit width errors of even a millionth of an inch cannot be tolerated at the narrow end of the range. These effects have been eliminated in the structure described herein. The only friction existing between the cam and the jaws during movement of the jaw members, other than molecular or internal friction involved in flexing the reed hinges and spring, occurs at the contact point between the cam follower 32 and the cam 31. When the cam is located in a particular position relative to the pivot axis of the jaw members, the friction occurring at the cam surface can be made to produce a torque in the same direction as the cam action and thus substantially eliminate any deleterious effects due to the friction.

FIG. 5 is a diagrammatic representation showing the slit mechanism including the cam mounted on a monochromator 60. Movement of the cam clockwise reduces or narrows the slit while counterclockwise movement widens or enlarges the slit. The cam 31 and the pivot axis 26 of the jaw members are disposed so that the tangent line 63 to the cam at the point of contact of the cam follower with the cam passes below the pivot axis 26. Stated differently, the cam 31 and the pivot axis 26 are positioned on opposite sides of the line 63 which lies in a plane perpendicular to the pivot axis and is tangent to the cam at the point of contact of the cam follower with the cam. This condition is desired at least when the mechanism is operating in the narrow slit region where an error of a millionth of an inch in slit width would be substantial. Of course, when the slit is in the order of a millimeter wide, a millionth of an inch error would not have as great an effect on the accuracy of the instrument. In some embodiments of the invention, it may not be possible or practical to obtain the desired relation between the cam and the jaw members over the entire operating range of the cam but this relation should be achieved in the narrow slit region.

Referring to FIG. 5, consider the situation when the cam is moving in the counterclockwise direction. A force due to the friction at the point of contact of the cam follower with the cam will be applied to the arm 28 at the point of contact and will be directed to the left along the tangent line 63. This force may be resolved into two components, one component passing through the pivot axis 26 and the other component being perpendicular to the first component. The first component will produce no torque on the arm 28 while the second component will produce a clockwise torque on the arm 28 tending to open the slit, which torque aids the torque on the arm due to the motion of the cam counterclockwise. If the tangent line 63 were to pass above the pivot axis 26, the torque on the arm 28 due to the friction force would tend to move the arm 28 counterclockwise which would be in opposition to the cam action and thereby produce mechanical hysteresis and erratic slit behavior. At narrow slit widths, such erratic behavior would be intolerable.

Similarly, the friction force aids the cam action when the cam is rotated clockwise to close the slit, if the desired relation of FIG. 5 exists. For clockwise rotation of the cam, the friction force acting on the arm 28 is directed along the tangent line 63 to the right, producing a counterclockwise torque on the arm 28 which aids the cam action in closing the slit.

Although an exemplary embodiment of the invention has been disclosed and discussed, it will be understood that other applications of the invention are possible and that the embodiment disclosed may be subjected to various changes, modifications and substitutions without necessarily departing from the spirit of the invention.

I claim as my invention:

1. In a mechanism for precisely controlling a slit over a wide band of slit widths, the combination of: a frame; a first jaw having a slit defining edge; a second jaw having a slit defining edge; means for mounting said jaws on said frame for rotation about a single pivot axis substantially parallel to the slit to bring said edges into abutment along a slit center line; means for rotating said first jaw about said pivot axis; a bar mounted on said frame for pivoting about a second pivot axis; and first and second resilient rods flexibly coupling said first and second jaws respectively to said bar on opposite sides of said second pivot axis for rotating said second jaw simultaneously with said first jaw in opposite directions through equal angles to define a slit equally disposed on both sides of said center line.

2. In a mechanism for precisely controlling a slit over a wide band of slit widths, the combination of: a frame; a first jaw having a slit defining edge; a second jaw having a slit defining edge; a first reed hinge for mounting said first jaw on said frame for rotation about a pivot axis substantially parallel to the slit; a second reed hinge for mounting said second jaw on said frame for rotation about said pivot axis to bring said edges into abutment along a slit center line; means for rotating said first jaw about said pivot axis; a bar; a resilient hinge for mounting said bar on said frame; and first and second flexible rods coupling said first and second jaws respectively to said bar on opposite sides of said hinge for rotating said second jaw simultaneously with said first jaw in opposite directions through equal angles to define a slit equally disposed on both sides of said center line.

3. In a mechanism for precisely controlling a slit over a wide band of slit widths, the combination of: a frame; a first jaw having a slit defining edge; a second jaw having a slit defining edge; means for mounting said jaws on said frame for rotation about a single pivot axis substantially parallel to the slit to bring said edges into abutment along a slit center line; a cam mounted for rotation relative to said frame, said cam having a narrow slit region and a wide slit region; a cam follower carried on and moving with said first jaw and contacting said cam at a point for rotating said first jaw as said cam is rotated with said cam and said pivot axis positioned on opposite sides of a plane parallel to said pivot axis and tangent to said cam at said point, at least in said narrow slit region; and means for rotating said second jaw simultaneously with said first jaw in opposite directions through equal angles to define a slit equally disposed on both sides of said center lines.

4. In a mechanism for adjusting the width of a slit defined by a pair of slit jaws, the combination of: a frame; a member carrying a slit jaw, said member including a cam follower operating in fixed relation to said slit jaw; means for mounting said member on said frame for rotation of said member, cam follower and slit jaw as a unit about a pivot axis, with said pivot axis substantially parallel to the slit; a cam engaging said cam follower to vary the width of a slit, said cam having a narrow slit region and a wide slit region; and means for mounting said cam for rotation relative to said frame, with said cam and said pivot axis on opposite sides of the tangent line to said cam at the point of contact of said follower in the plane of rotation of said member, at least in the narrow slit region, with the moving cam producing a frictional force on said follower at said point of contact which exerts a rotational torque on said member in the same direction as the throw of said cam.

5. In a mechanism for adjusting the width of a slit defined by a pair of slit jaws, the combination of: a frame; a first member for carrying a first slit jaw, said first member including a cam follower operating in fixed relation to said first slit jaw; a second member for carrying a second slit jaw; means for mounting said first member on said frame for rotation of said first member, cam follower and first slit jaw as a unit about a pivot axis, with said pivot axis substantially parallel to the slit; means for mounting said second member on said frame for rotation toward and away from said first member; a cam for engaging said cam follower to vary the width of the slit, said cam having a narrow slit region and a wide slit region; means for mounting said cam for rotation relative to said frame, with said cam and said pivot axis on opposite sides of the tangent line to said cam at the point of contact of said follower in the plane of rotation of said first member, at least in the narrow slit region, with the moving cam producing a frictional force on said follower at said point of contact which exerts a rotational torque on said first member in the same direction as the throw of said cam; and means for coupling said first member to said second member in driving relationship for simultaneous rotation of said members in opposite directions when said first member is rotated by said cam follower.

6. In a mechanism for adjusting the width of a slit defined by a pair of slit jaws, the combination of: a frame; a first member for carrying a first slit jaw, said first member including a cam follower operating in fixed relation to said first slit jaw; a second member for carrying a second slit jaw; means for mounting said first member on said frame for rotation of said first member, cam follower and first slit jaw as a unit about a pivot axis with said pivot axis substantially parallel to the slit; means for mounting said second member on said frame for rotation toward and away from said first member; a cam for engaging said cam follower to vary the width of the slit, said cam having a narrow slit region and a wide slit region; means mounting said cam for rotation relative to said frame, with said cam and said pivot axis on opposite sides of the tangent line to said cam at the point of contact of said follower in the plane of rotation of said first member, at least in the narrow slit region, with the moving cam producing a frictional force on said follower at said point of contact which exerts a rotational torque on said first member in the same direction as the throw of said cam; a lever pivotally mounted on said frame at a pivot line; a first link coupling said first member to said lever on one side of said pivot line; and a second link coupling said second member to said lever on the other side of said pivot line for simultaneous rotation of said members in opposite directions when said first member is rotated by said cam follower.

7. In a mechanism for adjusting the width of a slit defined by a pair of slit jaws, the combination of: a frame; a first member for carrying a first slit jaw, said first member including a cam follower operating in fixed relation to said first slit jaw; a second member for carrying a second slit jaw; means for mounting said first member on said frame for rotation of said first member, cam follower and first slit jaw as a unit about a pivot axis with said pivot axis substantially parallel to the slit; means for mounting said second member on said frame for rotation about said pivot axis; a cam for engaging said cam follower to vary the width of the slit, said cam having a narrow slit region and a wide slit region; means for mounting said cam for rotation relative to said frame, with said cam and said pivot axis on opposite sides of the tangent line to said cam at the point of contact of said follower in the plane of rotation of said first member, at least in the narrow slit region, with the moving cam producing a frictional force on said follower at said point of contact which exerts a rotational torque on said first member in the same direction as the throw of said cam; and means for coupling said first member to said second member in driving relationship for simultaneous and equal rotations of said members in opposite directions when said first member is rotated by said cam follower.

References Cited in the file of this patent

UNITED STATES PATENTS

| | | |
|---|---|---|
| 2,587,451 | Farrand | Feb. 26, 1952 |
| 2,607,899 | Cary et al. | Aug. 19, 1952 |
| 2,669,899 | Macleish | Feb. 23, 1954 |
| 2,705,440 | George et al. | Apr. 5, 1955 |
| 2,722,611 | Haupt | Nov. 1, 1955 |
| 2,795,170 | Hansen et al. | June 11, 1957 |